US008748813B2

(12) United States Patent
Steiner et al.

(10) Patent No.: US 8,748,813 B2

(45) Date of Patent: Jun. 10, 2014

(54) MASS SPECTROMETER WITH RIGID CONNECTION ASSEMBLIES

(71) Applicant: Bruker Daltonics, Inc., Billerica, MA (US)

(72) Inventors: Urs Steiner, Branford, CT (US); Lawrence B. Jones, San Jose, CA (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 14/034,732

(22) Filed: Sep. 24, 2013

(65) Prior Publication Data

US 2014/0054457 A1 Feb. 27, 2014

Related U.S. Application Data

(62) Division of application No. 13/184,225, filed on Jul. 15, 2011, now Pat. No. 8,575,545.

(51) Int. Cl.

| | |
|---|---|
| ***H01J 49/26*** | (2006.01) |
| ***H01J 49/36*** | (2006.01) |
| ***H01J 49/00*** | (2006.01) |
| ***H02J 1/10*** | (2006.01) |

(52) U.S. Cl.
USPC ................ 250/293; 250/290; 307/29; 307/38

(58) Field of Classification Search
USPC ......... 250/281, 282, 288, 289, 290, 292, 293; 307/18, 22, 29, 38, 57, 85
See application file for complete search history.

(56) References Cited

U.S. PATENT DOCUMENTS

| | | | | |
|---|---|---|---|---|
| 3,143,647 | A * | 8/1964 | Gunther et al. | 250/288 |
| 8,575,545 | B2 * | 11/2013 | Steiner et al. | 250/290 |
| 2006/0076485 | A1 * | 4/2006 | Stoermer et al. | 250/290 |
| 2008/0073510 | A1 * | 3/2008 | Finlay | 250/288 |
| 2013/0015342 | A1 * | 1/2013 | Steiner et al. | 250/282 |

* cited by examiner

*Primary Examiner* — Bernard E Souw

(74) *Attorney, Agent, or Firm* — Robic, LLP

(57) ABSTRACT

In one embodiment, a mass spectrometer includes an RF drive circuit for generating RF signals, a quadrupole mass filter, and a fixed connection assembly for delivering RF signals from the RF drive circuit to the quadrupole mass filter, the fixed connection assembly representing the entire delivery path of RF signals from the RF drive circuit to the quadrupole mass filter. By avoiding flexible components such as a free-standing wires or flexible circuit boards, the need for retuning when parts are removed or disturbed for testing or servicing is reduced, and a modular instrument in which components and connections are standardized and therefore interchangeable is realized.

5 Claims, 4 Drawing Sheets

MASS SPECTROMETER WITH RIGID CONNECTION ASSEMBLIES

This application is a division of application Ser. No. 13/184,225, which has been issued U.S. Pat. No. 8,575,545 on Nov. 5, 2013.

BACKGROUND OF THE INVENTION

1. Field of the Invention

The present disclosure relates generally to quadrupole mass filters used in mass spectrometers.

2. Description of the Related Art

Quadrupole mass spectrometers require a large RF voltage with a typical amplitude of several kilovolts. This voltage must be produced and connected to the quadrupole mass filter that resides inside a vacuum chamber. To efficiently achieve the required voltage, large coils or transformers are utilized in the RF drive circuit and are resonated with the capacitance of the quadrupole mass filter. Typically the RF drive circuit is designed around a separate box with RF coils or a transformer inside. This assembly is at atmospheric pressure, not under vacuum. The RF voltage generated by the inductors in the box is then delivered to the quadrupole mass filter in the vacuum chamber using a vacuum feedthrough and involves various wires, cables and flex boards both inside and outside of the vacuum chamber. A conventional arrangement is shown in FIG. 1, in which an RF drive circuit 102 uses a pair of RF coils 104 to generate the large voltages required. This voltage is delivered from RF board 106 using freestanding wires 108 (only two are shown) that pass by way of vacuum feedthrough 110 into the vacuum chamber 112. The wires 108 connect to a flexible circuit board (flex board) 114 in the vacuum environment, often by way of additional intervening circuit boards and freestanding wires (not shown). From flex board 114, RF energy is then distributed to the various rods 116 of the quadrupole mass filter.

The resonant frequency of the circuit is affected by the variability of stray capacitance in all of the connection components, and is specific to the particular configuration of these flexible components as last established after assembly and after any subsequent adjustment and handling. Thus, because the flexibility of the components is attended by variability in their capacitance and/or inductance signatures, the circuit must be tuned into resonance using a tuning mechanism 118 that will re-adjust either the capacitance or inductance in the circuit. This tuning, which is arduous and time consuming, must be performed following each intended or unintended change in configuration of the flexible connection components that inevitably attends every handling, for example after circuit board removal for inspection or replacement.

SUMMARY OF THE INVENTION

As described herein, a method for delivering RF signals from an RF drive circuit to a quadrupole mass filter includes electrically coupling RF signals generated by the RF drive circuit using a fixed conductor path devoid of flexible components between the RF drive circuit and the quadrupole mass filter.

Also as described herein, a method for tuning an RF circuit providing RF signals to a mass spectrometer includes coupling the RF circuit to a first quadrupole mass filter, tuning the RF circuit coupled to the first quadrupole mass filter, decoupling the RF circuit from the first quadrupole mass filter, and coupling the RF circuit to a second quadrupole mass filter for operation with second mass quadrupole filter.

Also as described herein, a mass spectrometer includes an RF drive circuit for generating RF signals, a quadrupole mass filter, and a fixed connection assembly for delivering RF signals from the RF drive circuit to the quadrupole mass filter, the fixed connection assembly representing the entire delivery path of RF signals from the RF drive circuit to the quadrupole mass filter.

Also as described herein, a mass spectrometer includes a plurality of RF drive circuits, a plurality of quadrupole mass filters, and a plurality of fixed connection assemblies each configured to deliver RF signals from a corresponding RF drive circuit to a corresponding quadrupole mass filter, two of the fixed connection assemblies being substantially identical to one another such that they are interchangeable with one another without re-tuning.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 2A is a diagram of a contact pin in accordance with one embodiment;

DETAILED DESCRIPTION

Example embodiments are described herein in the context of a fixed connection assembly for an RF drive circuit in a mass spectrometer. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
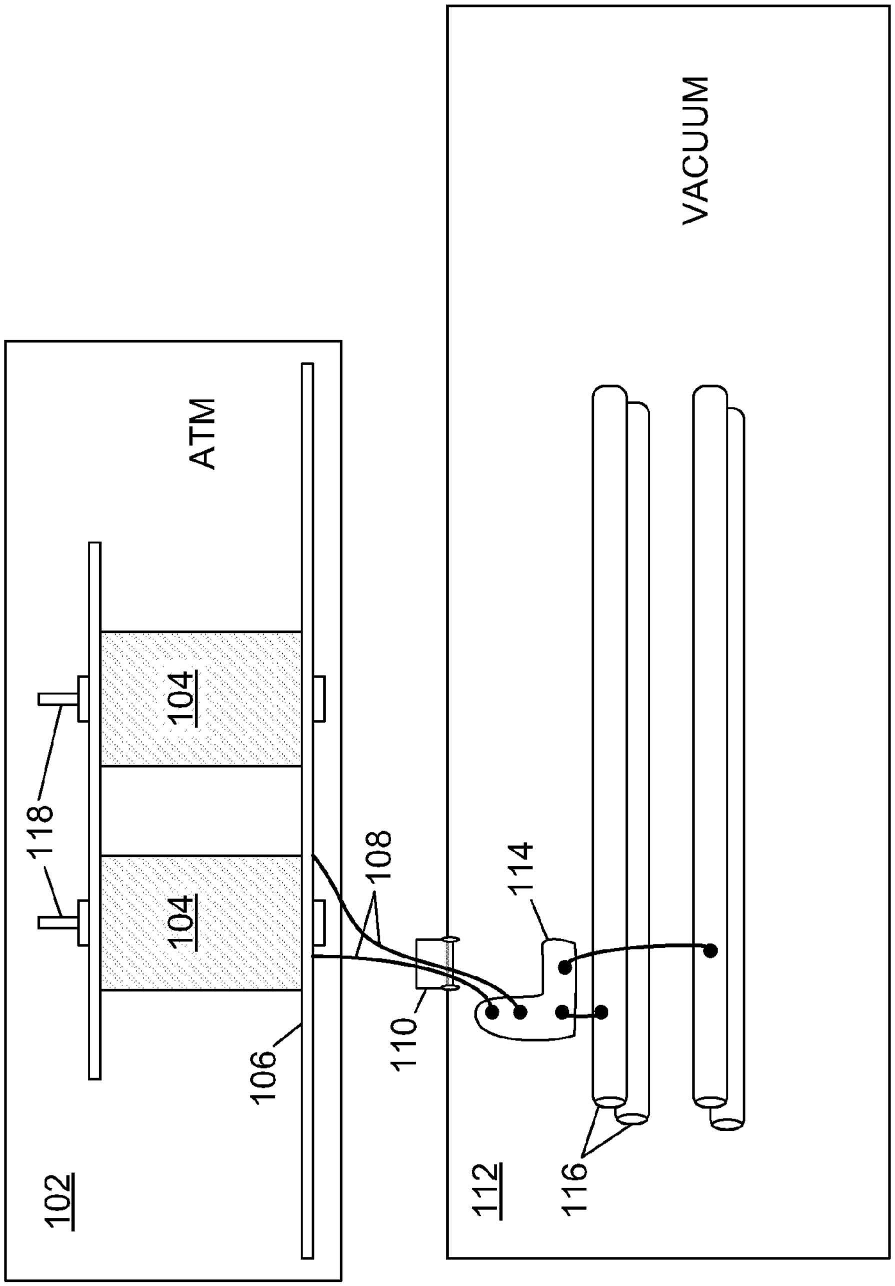
FIG. 1 (PRIOR ART)
FIG. 1 is a schematic diagram of a conventional arrangement for connecting an RF drive circuit to a quadrupole mass filter in a mass spectrometer.
Figure 2:
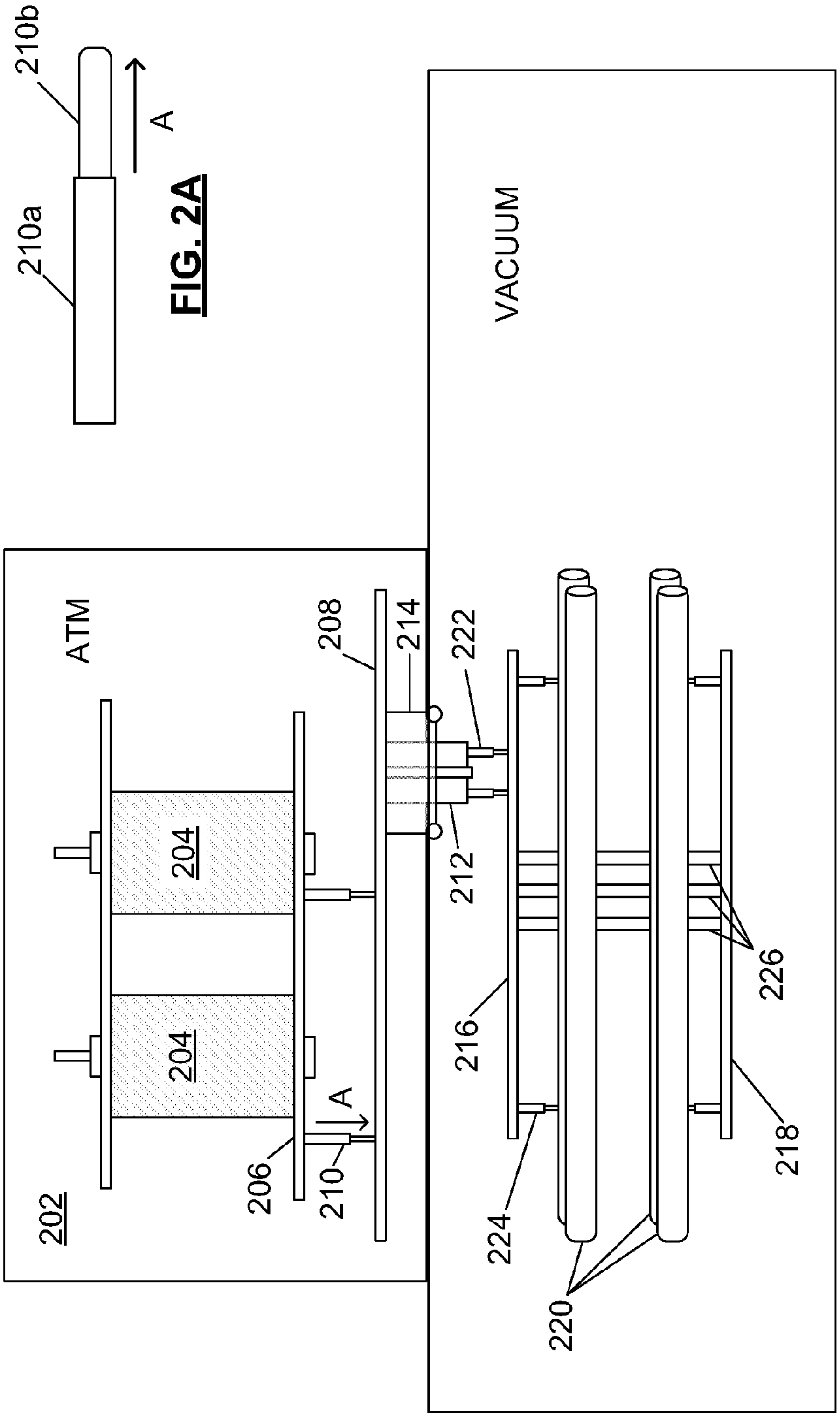
FIG. 2 is a schematic diagram of an embodiment for connecting an RF drive circuit to a quadrupole mass filter in a mass spectrometer using fixed connection paths.

FIG. 2 is block diagram of an arrangement for providing RF voltage to a quadrupole mass filter that minimizes capacitance variability and reduces the need for repeated tuning, or example following circuit board removal for inspection or replacement. In this arrangement, flexible connection components are substantially eliminated in favor of a fixed or rigid geometry, using rigid connectors such as contact pins or the like, and pre-defined geometries, in a fixed connection assembly detailed further below. Effectively, a fixed electrical conductor path that is substantially devoid of flexible components, such as freestanding wires (as distinguished from conductor traces on printed circuit boards) or flexible circuit boards, is utilized to deliver RF signals from the RF drive circuit of the mass spectrometer to its quadrupole mass filter components or to other RF components such as ion guides or ion traps.

With reference to FIG. 2, an RF drive circuit 202 having a pair of RF coils 204 and an RF coil holder board 206 for receiving signals from the coils are shown. The RF signals are delivered from the coil board 206 to RF base board 208 using contact pins 210 that are substantially rigid in all but one dimension—axially. In the axial dimension, the contact pins 210 are spring-loaded and have a prescribed amount of travel and axial bias in order to maintain contact with corresponding pads (not shown) provided on RF base board 208 and establish an electrical connection therewith, at the same time allowing for some tolerance but without exerting distorting pressure. A telescoping structure having first (210*a*) and second (210*b*) segments that are spring-biased relative to one another can be used to achieve this functionality, as illustrated in FIG. 2A. Axial motion is illustrated by arrow A, in the direction of spring bias.

The RF signals are delivered from base board 208 into the vacuum environment through RF detector board 212 passing through vacuum feed through 214. RF detector board 212 operates to provide feedback to control and manage the stability and amplitude of the RF signal, and utilizes a temperature control mechanism (not shown) to stabilize RF sampling circuits and capacitors (not shown) that provide a measure of RF for feedback purposes. Details of this operation are not the subject of this disclosure and are omitted for clarity.

From RF detector board 212, the RF signal is delivered to quadrupole boards 216 (upper board) and 218 (lower board) for coupling to the rods 220 of the quadrupole mass filter. Delivery to the upper board 216 is by way of contact pins 222, similar to those described above, but possibly having different dimensions, force parameters and the like, and delivery of RF to rods 220 is by way of contact pins 224, also similar to those described above, but possibly having different dimensions, force parameters and the like. Connections between upper and lower quadrupole boards is by way of rigid standoff pins 226 that may be bolted to the boards and electrically coupled thereto as necessary. The standoff pins 226 variously serve to carry RF signals and DC voltage as necessary. With respect to biasing of the pins against rods 220, deformation of the rods is a factor that should be minimized because of its impact on the magnetic and electric behavior and fields established during operation.

Because the arrangement as described herein uses rigid, fixed connections and components, the physical and electrical characteristics effectively default to a known and predictable configuration that minimizes the need for re-calibrating or re-tuning after handling or replacement of components. Moreover, the configuration can be duplicated for multiple quadrupole mass filters that are disposed in line in the same spectrometry instrument, or even in different instruments, and the parts can be interchanged without substantial change to physical and electrical characteristics, in effect modularizing the combination of components used and making for a scalable configuration. The need to re-tune is particularly minimized when components in one location in one instrument are swapped out with components in the corresponding location in another instrument. Within the same instrument, however, some retuning will likely be required to account for stray capacitances that differ from one location to another.

Figure 3:
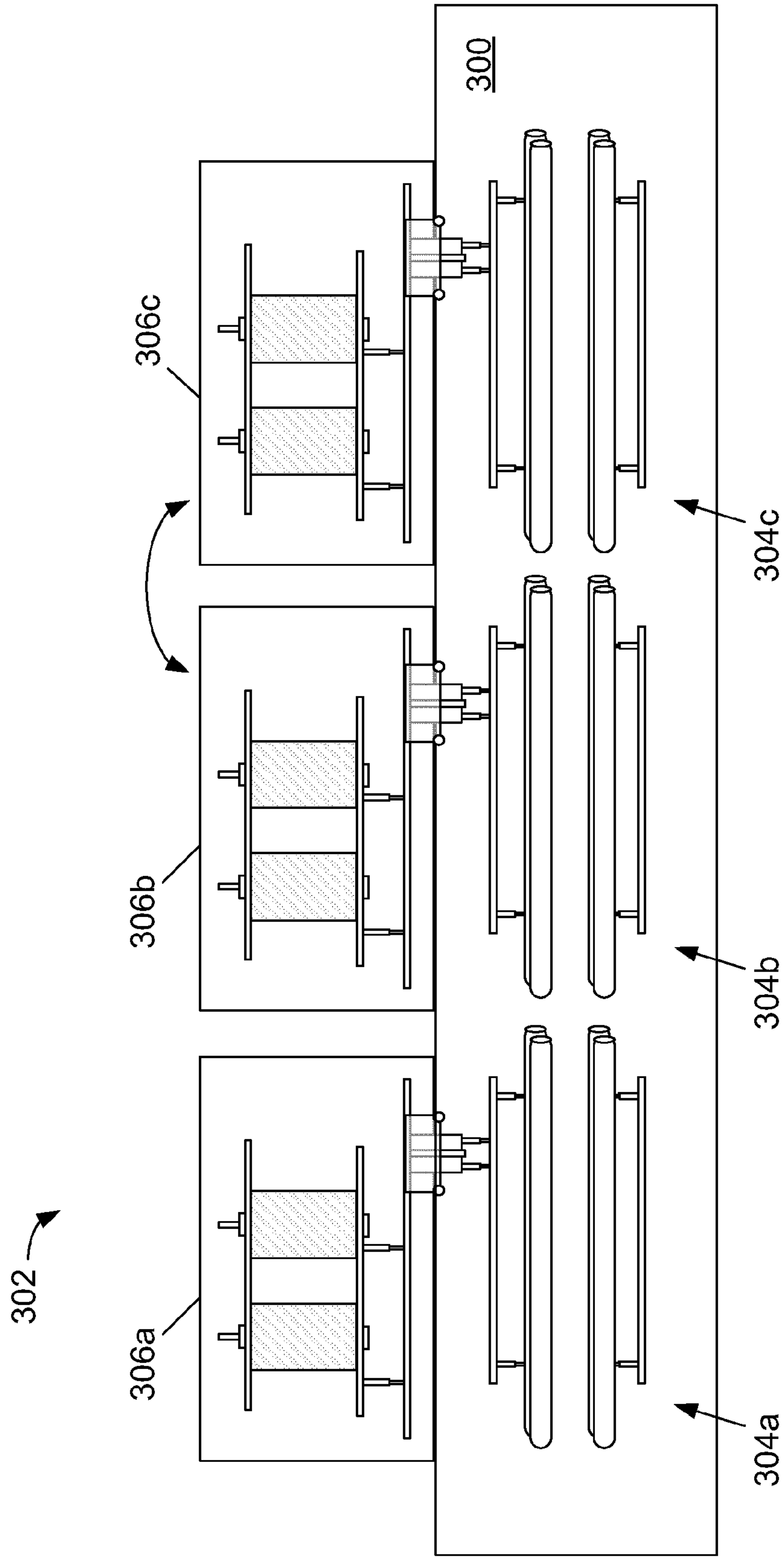
FIG. 3 is a schematic diagram illustrating interchangeability of RF drive circuits in a mass spectrometer in accordance with an embodiment.

With reference to FIG. 3, such a modular configuration within a single mass spectrometer instrument is shown, with some details omitted for clarity. It should be noted that modularization naturally extends to multiple instruments, and particularly to locations that correspond with each other in different instruments as explained above. In the arrangement of FIG. 3, vacuum chamber 300 of mass spectrometer 302 includes three quadrupole mass filters 304*a*, 304*b* and 304*c* (collectively 304). Each of these receives RF signals from its respective RF drive circuit 306 (306*a*, 306*b*, and 306*c*), coupled thereto for delivery of the RF signals from the atmospheric environment of the drive circuits to the vacuum environment of the mass filters in the manner described above. The RF drive circuits 306 are substantially identical to one another in electrical and physical characteristics, including dimensions, materials, flexibility/rigidity and the like, and their connections to their respective quadrupole mass filters 304 are similarly substantially identical, affording interchangeability of all these components and connections. Such interchangeability is indicated by the double-headed arrow between RF drive circuits 306*b* and 306*c* for example. The resulting arrangement thus realizes an instrument that requires minimal component re-tuning or other adjustments when the components are swapped out for maintenance, testing, or other handling.

Figure 4:
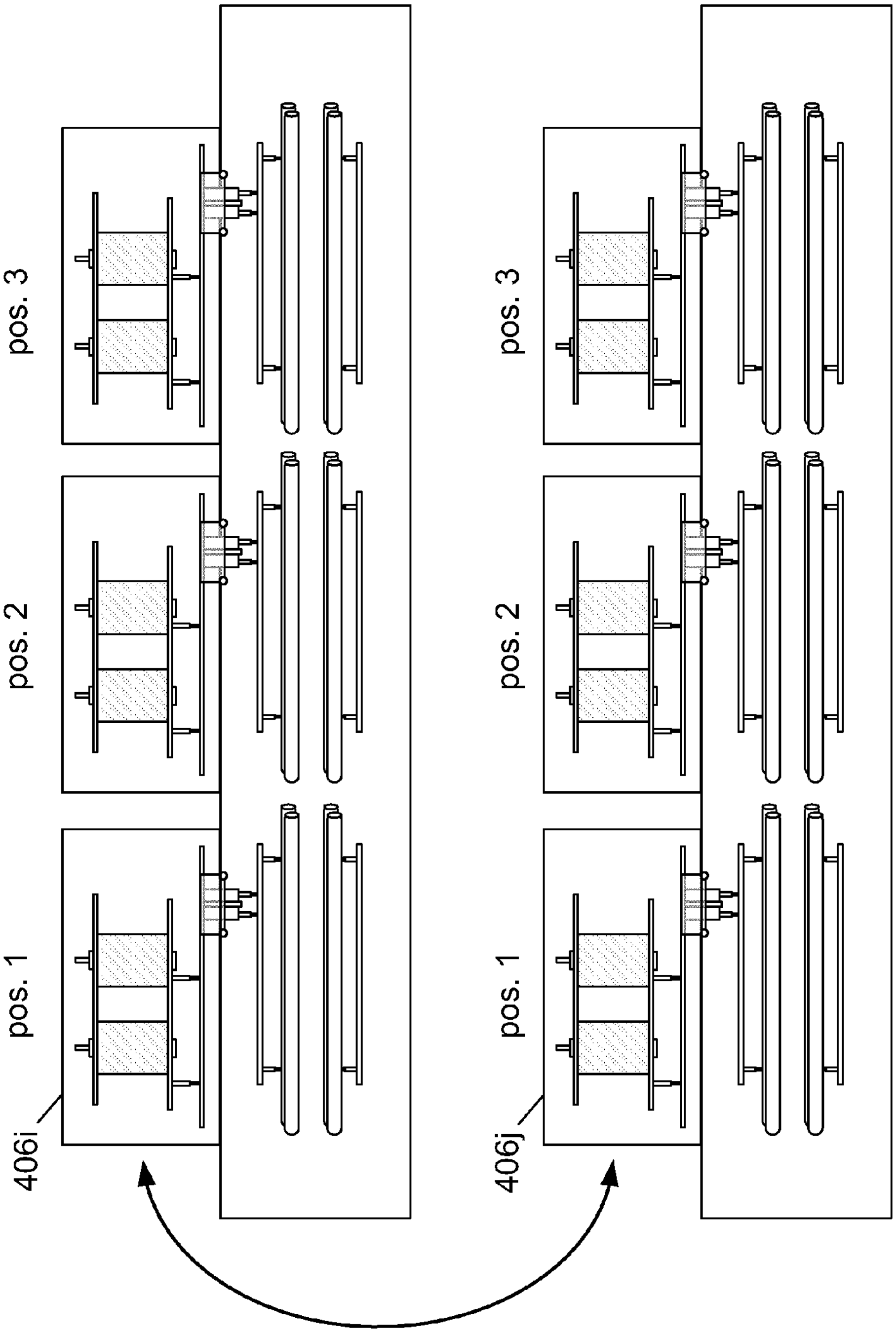
FIG. 4 is a schematic diagram illustrating interchangeability of RF drive circuits of different mass spectrometers in accordance with an embodiment.

Similar advantages are realized when such swapping out or handling is conducted between different mass spectrometer instruments, and not just within one instrument. This is illustrated by the double-headed arrow in FIG. 4, showing swapping out of RF drive circuits 406*i* and 406*j* of different mass spectrometers 400 and 404, from the first position (pos. 1) of each instrument (that is, from corresponding positions in the two instruments). Of course while this interchangeability and modularity is explained with respect to the RF drive circuits, it is also applicable to the quadrupole mass filters since they and their connections can be substantially identical within the same instrument or from instrument to instrument.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

The invention claimed is:

1. A mass spectrometer comprising:

a plurality of RF drive circuits;

a plurality of quadrupole mass filters; and a plurality of rigid connection assemblies each configured to deliver RF signals from a corresponding RF drive circuit to a corresponding quadrupole mass filter, two of the rigid connection assemblies being substantially identical to one another such that they are interchangeable with one another.

2. The mass spectrometer of claim 1, wherein the rigid connection assemblies represent the entire delivery path of RF signals from a corresponding RF drive circuit to a corresponding quadrupole mass filter.

3. The mass spectrometer of claim 2, wherein the rigid connection assemblies are devoid of flexible components.

4. The mass spectrometer of claim 2, wherein the rigid connection assemblies are devoid of freestanding wires or flexible circuit boards.

5. A mass spectrometer comprising:

a modular and removable RF drive circuit for generating RF signals;

a quadrupole mass filter; and a connection assembly with signal traces that have a fixed length and are rigidly held in position relative to each other and ground for delivering RF signals from the RF drive circuit to the quadrupole mass filter with substantially constant capacitance, so that the RF drive circuit can be disconnected from the quadrupole mass filter and reconnected without retuning.

* * * * *